Jan. 24, 1961
E. B. HAMMOND, JR
2,968,871
STABILIZED COMPUTING GUN SIGHT
Filed March 25, 1943
7 Sheets-Sheet 4
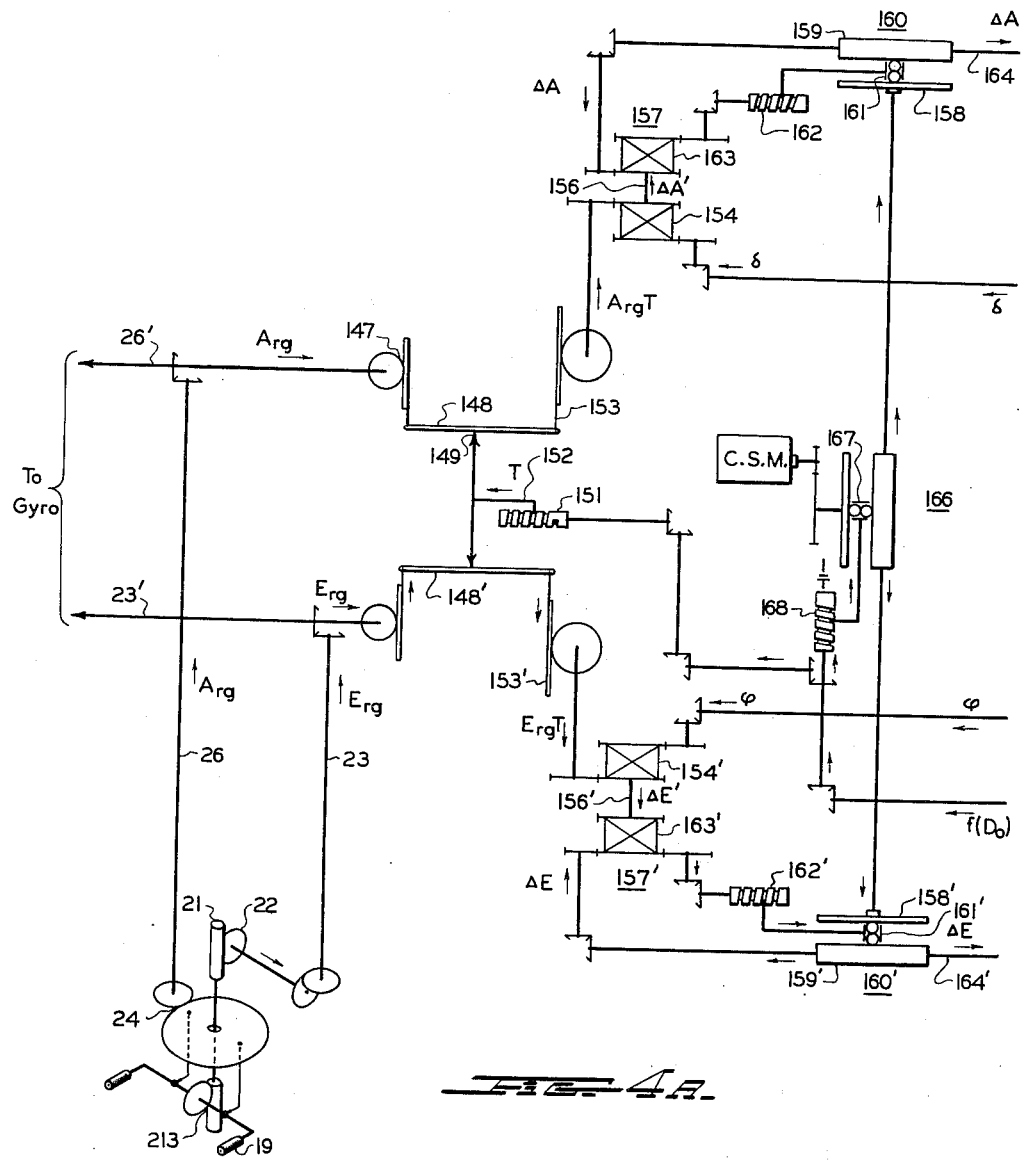
INVENTOR
EDMUND B. HAMMOND, JR.
BY
Herbert P. Thompson
his ATTORNEY.

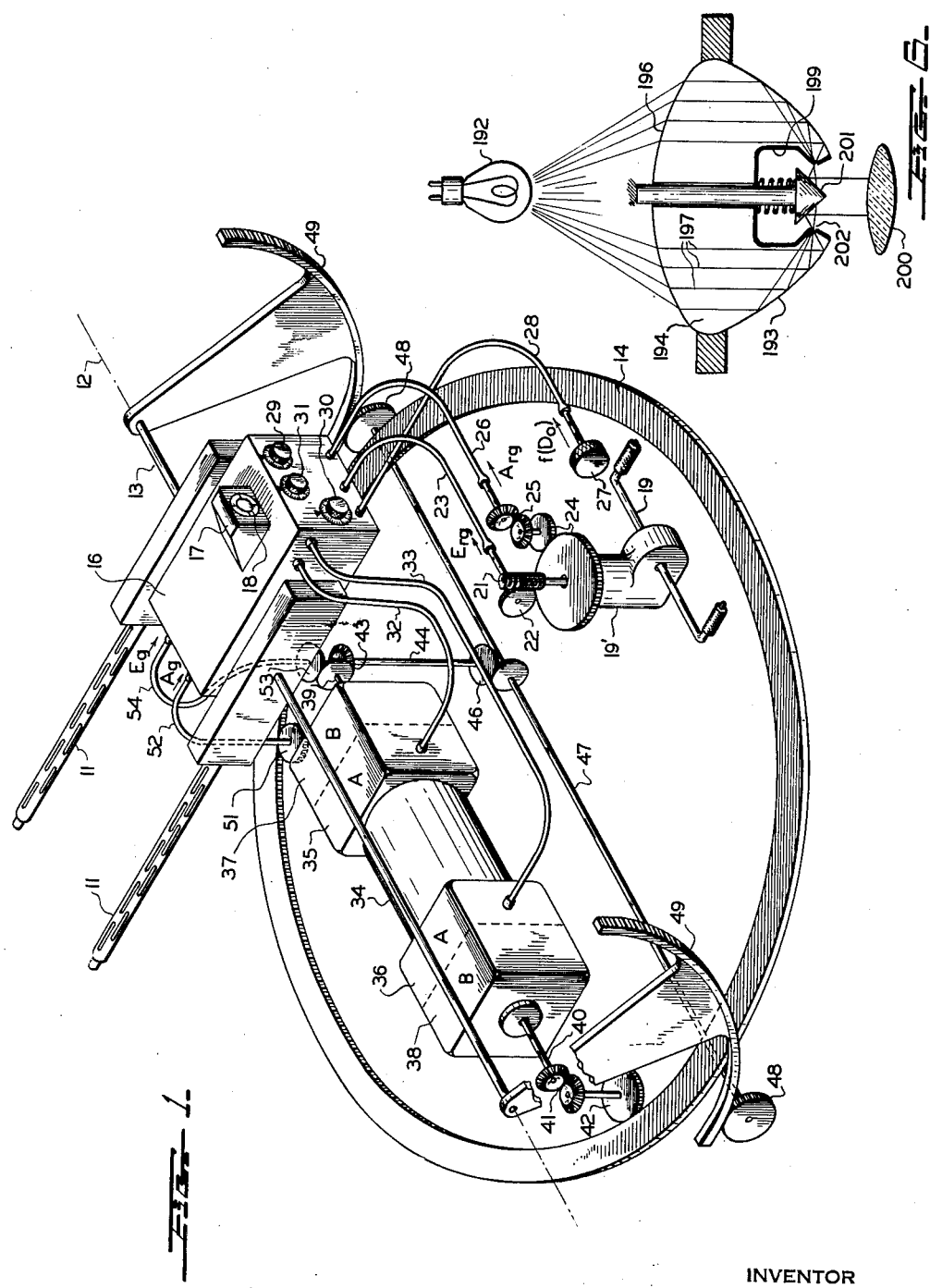

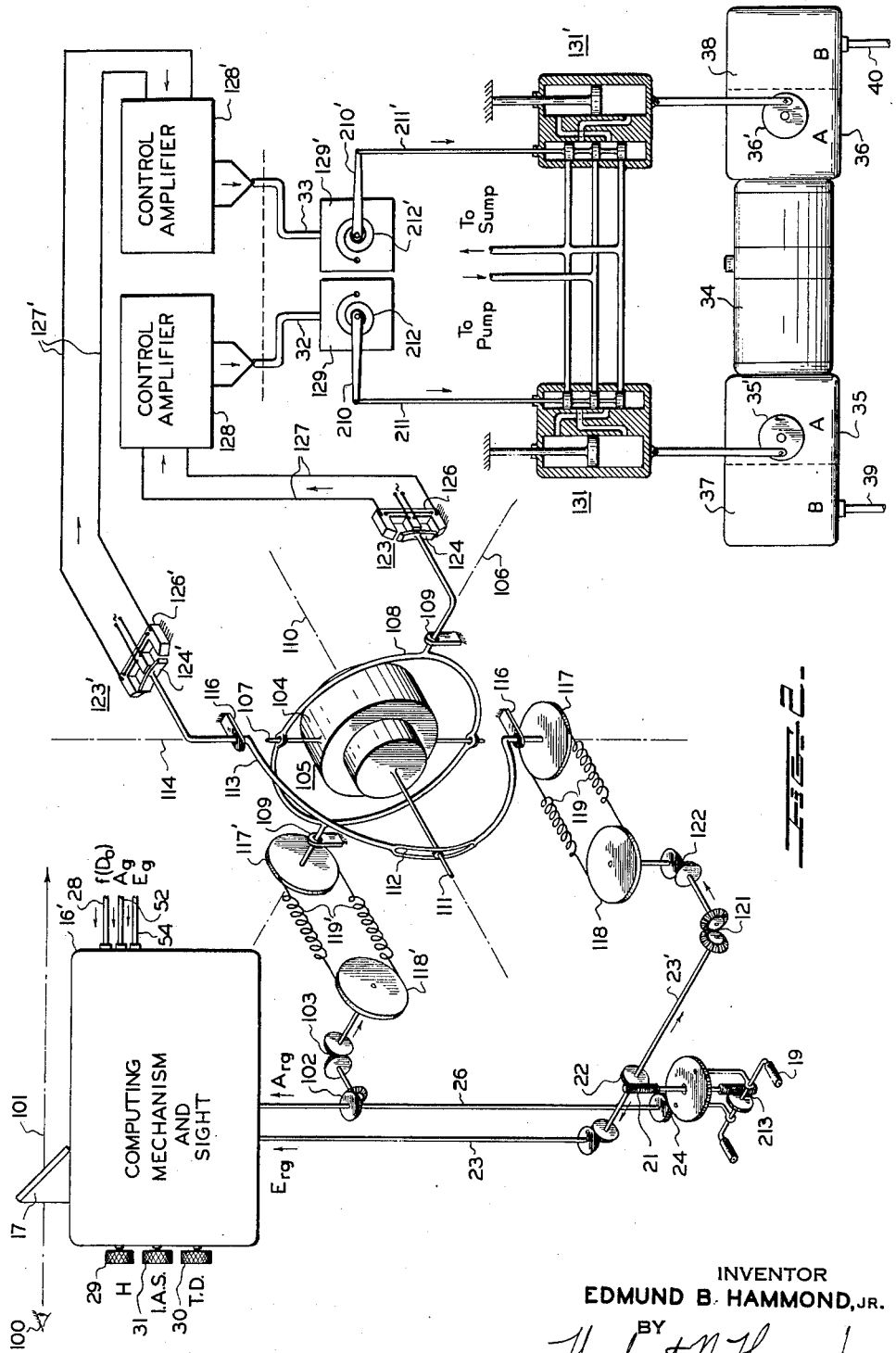

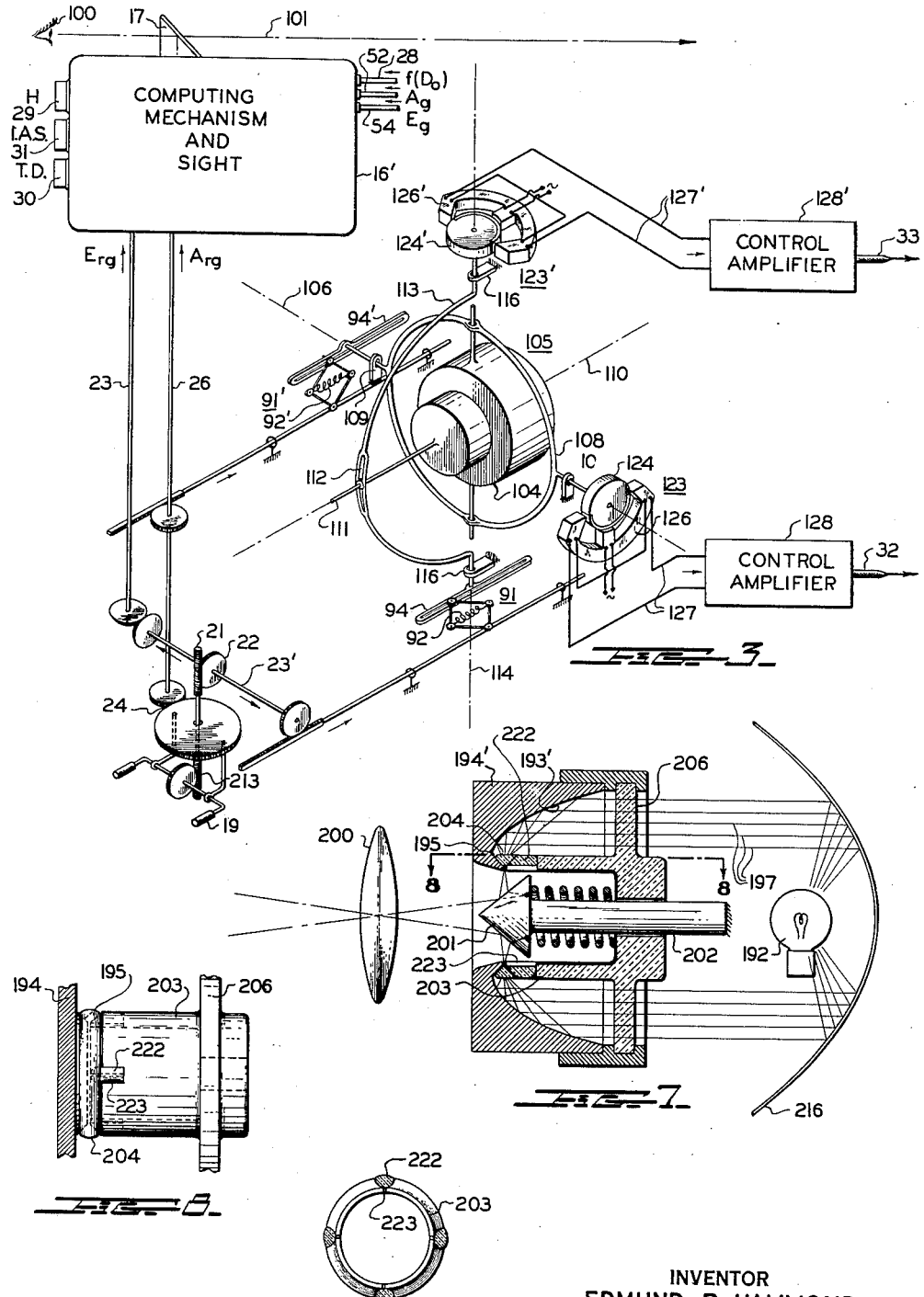

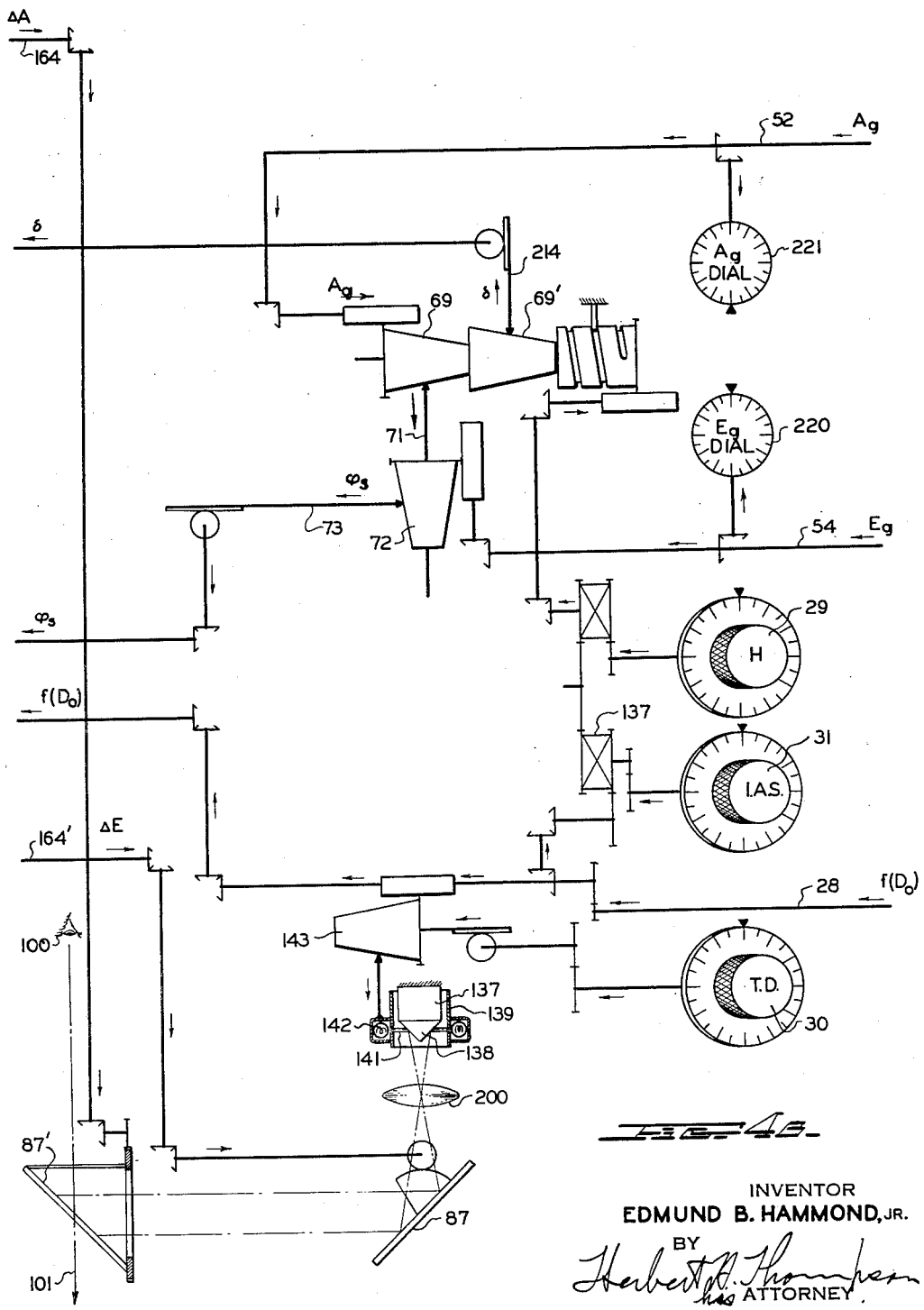

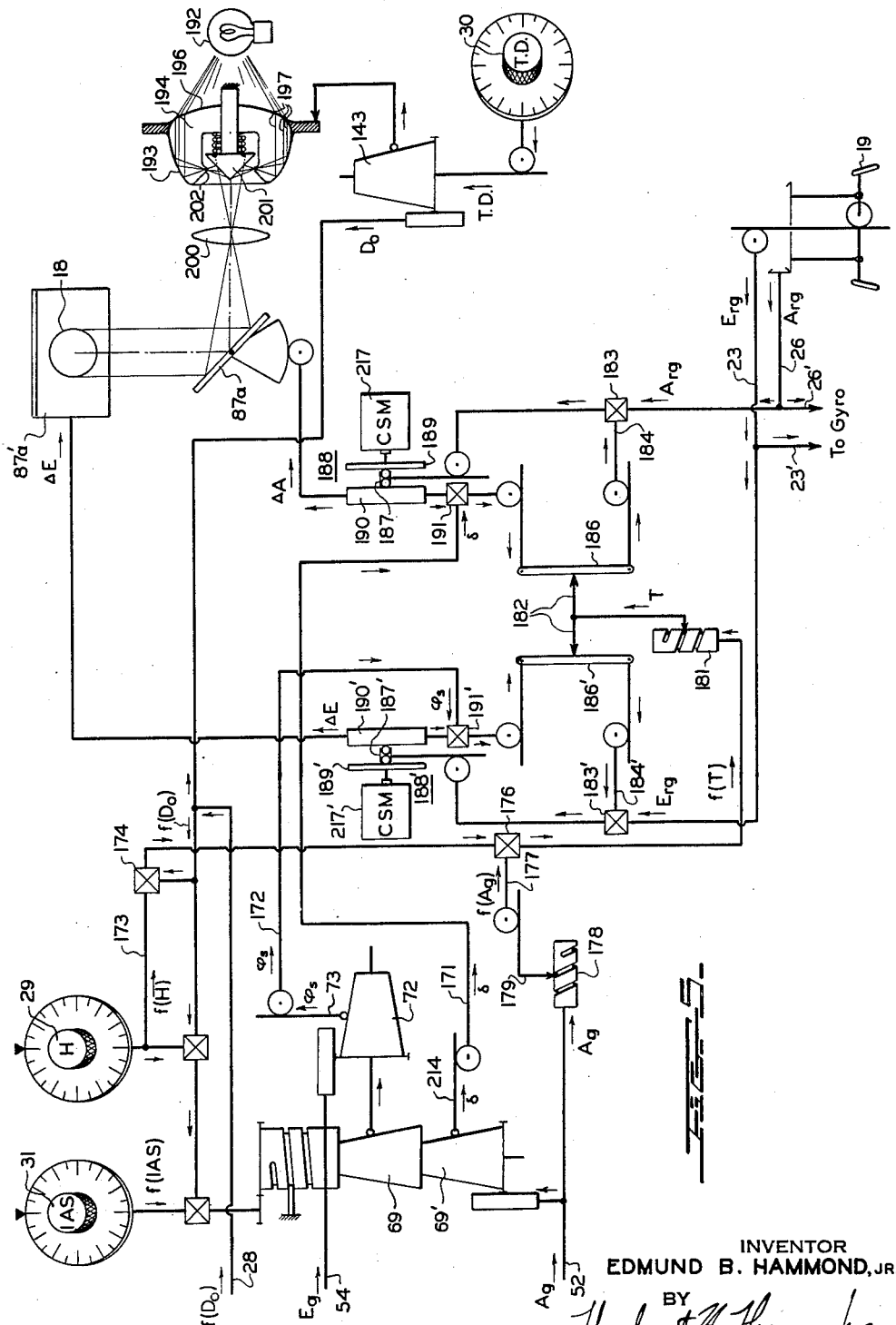

Jan. 24, 1961     E. B. HAMMOND, JR     2,968,871
STABILIZED COMPUTING GUN SIGHT
Filed March 25, 1943     7 Sheets-Sheet 7
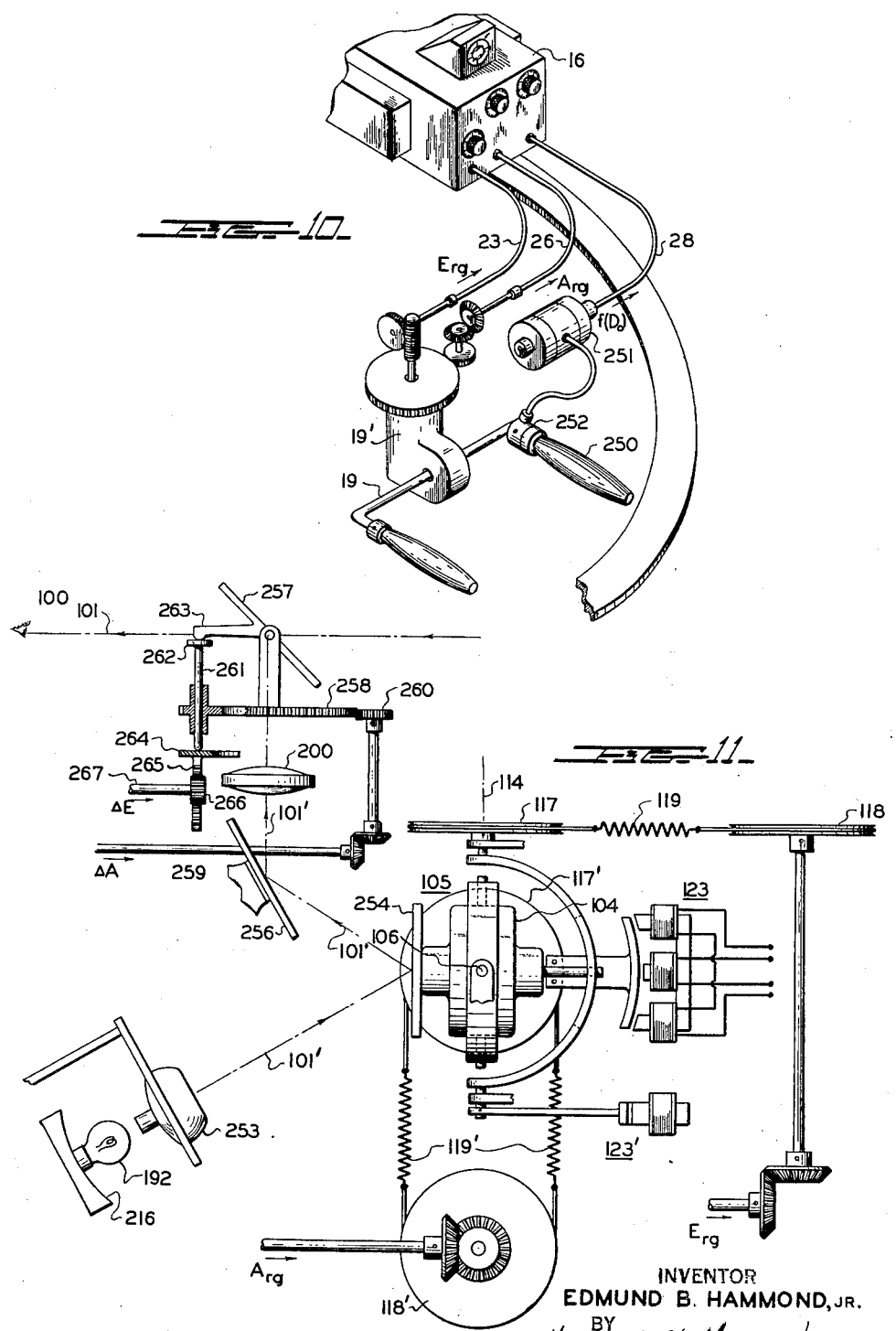
INVENTOR
EDMUND B. HAMMOND, JR.
BY
Herbert H. Thompson
his ATTORNEY United States Patent Office 2,968,871
Patented Jan. 24, 1961

2,968,871
STABILIZED COMPUTING GUN SIGHT

Edmund B. Hammond, Jr., Brooklyn, N.Y., assignor to Sperry Rand Corporation, a corporation of Delaware Filed Mar. 25, 1943, Ser. No. 480,572

12 Claims. (Cl. 33—49)

This invention relates generally to the art of gun fire control and, more particularly, to means for controlling the fire of inter-aircraft guns, or any light anti-aircraft guns which are mounted on an unstable base, such as a ship, truck, or tank.

Computing gun sights are known wherein the operator, through manual controls, positions the gun in such a manner as to maintain the line of sight of an optical system mounted thereon directed toward the target, and in which a computing mechanism, also carried on the guns, computes the proper lead angles and automatically offsets the optical line of sight from the gun axis by these angles. Such sights are commonly termed "disturbed" sights.

The present invention comprises improved forms of such sights wherein greater accuracy is obtained in the computation of these lead angles, and wherein means are provided for completely stabilizing both the guns themselves and the optical system carried thereby, thus eliminating the difficulties and inaccuracies ordinarily encountered when it is attempted to employ such sights on pitching or rolling craft.

Improved means are also provided for avoiding the instability which is inherent in such disturbed sights for reasons which will be fully explained hereinafter. Also, there are disclosed several improved types of optical range finders particularly adapted for use with such sights.

Accordingly, the principal object of the present invention is to provide a highly accurate and completely stabilized computing gun sight.

Another object of the invention is to provide improved means for applying precessing torques to a substantially free gyro in order to control its velocity of precession.

Still another object of the invention is to provide means for directly stabilizing the optical line of sight of such a sight irrespective and independent of any follow-up system associated with the stabilizing gyroscope.

A further object is to provide a disturbed gun sight wherein the computed lead angles based on gun rates are delayably applied to the optical line of sight in order to avoid unstable operation.

A still further object is to provide a disturbed gun sight wherein the computed lead angles based on gun rates are delayably applied to the optical line of sight, the amount of said delay being varied substantially in accordance with the projectile travel time to the target being tracked.

Yet another object is to provide improved control means for gun sights whereby the operator may easily track the target in elevation and azimuth and at the same time set slant range into the sight.

Other objects and advantages will become apparent from the specification, taken in connection with the accompanying drawings wherein the invention is embodied in concrete form.

In the drawings,

Fig. 1 is a general arrangement of the complete turret showing the guns, gun sight, control apparatus, power follow-up means, and the means for mounting the whole apparatus for rotation in elevation and azimuth.

Fig. 2 is a partially perspective drawing of the stabilizing mechanism and the power follow-up mechanism of Fig. 1.

Fig. 3 is a perspective view of a modified form of the stabilizing mechanism shown in Fig. 2.

Figs. 4A and 4B taken together are a schematic representation of the computing and sighting mechanism of the present invention.

Fig. 5 is a schematic representation of an improved modification of the computing and sighting mechanism of Figs. 4A and 4B, showing also an improved type of range finder.

Fig. 6 is a cross-sectional view through the reticle-forming apparatus of the range finder of Fig. 5.

Fig. 7 is a cross-sectional view through a modified form of such reticle-forming apparatus.

Fig. 8 is a cross-sectional view taken along the line 8—8 of Fig. 7.

Fig. 9 is an end view of a detail of Fig. 8.

Fig. 10 is a perspective drawing showing improved control apparatus for setting range into the sight.

Fig. 11 is a schematic representation showing improved apparatus for completely stabilizing the optical systems of Figs. 4A and 4B, and Fig. 5.

Similar characters of reference are used in all of the above figures to indicate corresponding parts. Arrows are used to indicate the direction of flow of information or control influence.

Referring now to Fig. 1 in which there is shown a general arrangement of the stabilized turret and computer of the present invention, the guns 11 are made rotatable about a normally horizontal elevation axis 12 by being mounted on a shaft 13. The guns 11 are also rotatable in azimuth about a normally vertical azimuth axis by being rotatably mounted within an azimuth ring gear 14 in the manner to be described. Fixed to the guns and carried therewith is the computing and stabilizing mechanism 16 including the optics 17 in which there appears the reticle 18.

The present system constitutes a disturbed gun sight, that is, one in which the orientation of the gun is directly controlled from a manual control by the operator in a manner such as to maintain the optical line of sight directed at the target, and in which the computing mechanism automatically offsets the optical axis from the gun orientation by the amount required to provide the proper lead angle for the gun to direct a projectile at the target.

In operation the gunner manipulates the manual control 19 of a suitable control mechanism 19', shown, for illustrative purposes only, as being of the handlebar control type wherein said manual control 19 is adapted to be angularly displaced about two peripendicular axes corresponding to the azimuth axis and the elevation axis of the guns 11. In the present invention such angular displacement produces a proportional angular velocity of the guns 11 and the computing and stabilizing mechanism 16 carried thereby about the corresponding axes.

For this purpose the angular displacement of handlebar 19 about its elevation axis is transferred by way of gearing 213 located within the base 19' (see Fig. 2), circular rack 21, pinion 22, and flexible shaft 23 to the computing and stabilizing mechanism 16 where it is employed as gun elevation rate ($E_{rg}$) data in computing the elevation lead angle ($\Delta E$). Similarly, the azimuth displacement of the handlebar control 19, corresponding to gun azimuth rate ($A_{rg}$), is transmitted by way of gearing 24, gearing 25, and flexible shaft 26 to mechanism 16 where it is employed in computing the azimuth lead angle ($\Delta A$).

In addition to being employed as necessary data in the computation of lead angle components these gun elevation and gun azimuth rates, appearing as proportional rotations of flexible shafts 23 and 26, respectively, are used to precess a free stabilizing gyro also located within the mechanism 16 at proportional rates in elevation and azimuth. As will later be described more completely in connection with Fig. 2, two suitable pick-offs, one for elevation and one for azimuth, are provided which sense any relative displacement existing in the corresponding coordinate between the gyro orientation and the gun orientation, and which produce on output cables 32 and 33, respectively, voltage signals proportional thereto. These voltage signals are then employed to drive suitable respective servos to maintain the gun orientation coincident with that of the gyro.

In the present instance, this servo mechanism is illustrated as being a double-ended Vickers hydraulic variable speed transmission system comprising a drive motor 34 actuating the respective azimuth and elevation A-ends of the system. The A-ends comprise respective variable displacement hydraulic drive pumps indicated schematically at 35 and 36, which are connected to drive the respective hydraulic motors 37 and 38, representing the B-ends of this Vickers unit. In the manner well known, the angular velocity of the output shafts 39 and 40 of these B-ends 37 and 38 will be proportional to the angular displacement of the controls 35', 36' (see Fig. 2) of the respective A-ends controlling the displacements of the hydraulic pumps 35, 36. These controls 35', 36' are actuated in accordance with the signals appearing on cables 32, 33 as will be described hereinafter.

The output of azimuth B-end 38 is connected by way of shaft 40 and gearing 41 to an azimuth drive pinion 42 engaging the fixed internal ring gear 14. The entire apparatus except the ring gear 14 is made rotatable about the azimuth axis, and accordingly, the rotation of pinion 42 thus produced, drives the entire apparatus, including the guns, in azimuth at whatever rate the operator finds necessary to maintain the optical line of sight directed at the target in azimuth. The output of elevation B-end 37 is connected by way of shaft 39, gearing 43, shaft 44, gearing 46, shaft 47, pinions 48, and gear sectors 49 to rotate shaft 13 and thereby to rotate the guns and sight in elevation, again at the proper rate to track the target.

Data corresponding to the gun orientation as determined by its elevation ($E_g$) and azimuth ($A_g$) components are introduced into the computing and stabilizing mechanism 16, by way of flexible shafts 54 and 52, respectively actuated by pinions 53 and 51, driven by the motion of the guns in elevation and azimuth, whereby the angular displacements of shafts 54 and 52 are proportional respectively, to the angular displacements of the guns in elevation and azimuth from predetermined neutral or datum position.

The computing and stabilizing mechanism 16 also contains a built-in range finder whereby the diameter of the circular reticle image 18 may be adjusted by actuation of a suitable range control knob 27 and flexible shaft 28 to just circumscribe the image of the target seen in the optical system. When this is done, and when a suitable target dimension (T.D.) setting has been set into the device, as by target dimension knob and scale 30, the angular displacement of control knob 27 will represent a non-linear function of the slant range ($D_0$) to the target, which displacement is then also utilized in the computing portion of mechanism 16 in determining the azimuth and elevation components of the gun lead angle. The computing and stabilizing mechanism 16 is also provided with an altitude (H) setting knob and scale 29 and an indicated air speed (I.A.S.) setting knob and scale 31 for taking these quantities into consideration in the determination of the required lead angle components.

Instead of the knob 27, provided for manual rotation of slant range shaft 28, it is contemplated that a motor 251 controlled from a manually operated switch 252 could be used, as shown in Fig. 10. One handle of the manual control 19, for example, could have concentrically mounted thereon a rotatable handle grip 250 of the type commonly used on motorcycles. This grip would operate the switch referred to above which would be electrically connected to the range motor 251 directly actuating the slant range shaft 28, so that the operator could increase, or decrease, or maintain constant the setting of shaft 28 by rotationally positioning hand grip 250 to a right, a left, or a central position, respectively.

Thus, with data having been received corresponding to gun azimuth and elevation ($A_g$) and ($E_g$), gun azimuth and elevation rates ($A_{rg}$) and ($E_{rg}$), slant range ($D_0$), indicated air speed (I.A.S.) and altitude (H), the computing mechanism 16' (see Fig. 2), included within the computing and stabilizing mechanism 16, computes the azimuth and elevation coordinates ($\Delta A$) and ($\Delta E$) of the lead angle required to effect a hit upon the target being tracked, and automatically offsets the optical line of sight, defined by the optical system, with respect to the orientation of the guns, by this computed lead angle.

As previously suggested, the present invention includes gyroscopic means for stabilizing the operation of the device to prevent fluctuations of the line of sight and of the gun orientation relative to the target. Due to random variations in the attitude of the craft carrying the device, such a stabilizing feature is particularly adapted for use on aircraft, but may also be advantageously used in other types of vehicles, such as ships, tanks, trucks, and so forth.

Referring to Fig. 2, which shows in detail the stabilizing apparatus of the computing and stabilizing mechanism 16 of Fig. 1 and also the servo mechanism of Fig. 1, it will be seen that displacement of handlebar control 19 about its elevation axis produces a corresponding displacement of the gun elevation rate ($E_{rg}$) input shaft 23 to the computing mechanism 16' which also forms part of the computing and stabilizing mechanism 16 of Fig. 1. Angular displacement of control 19 about its azimuth axis produces a corresponding angular displacement of the gun azimuth rate ($A_{rg}$) input shaft 26.

For simplicity of explanation, the operation of the stabilizing apparatus will be described with respect to one coordinate only, such as elevation. As shown, movement of the manual control 19 in elevation also serves to angularly displace another gun elevation rate shaft 23', the angular displacement of which shaft is utilized to precess the spin axis 110 of a free gyro 105 about a horizontal axis 106, which axis is parallel to the gun trunnion axis 12 of the guns 11, at a rate proportional to the displacement of shaft 23'. Gyro 104 is pivotally mounted for turning about an axis 107 perpendicular to both its spin axis 110 and the gun trunnion axis 12 within a gimbal ring 108. Ring 108 in turn is pivotally mounted for turning about horizontal axis 106 by being supported in pivots such as 109 fixed to the gun.

An extension 111 of the rotor casing 104 of gyro 105, aligned with the spin axis 110 of the gyro rotor, passes through an aperture 112 in a bail ring 113 which is pivoted about an axis 114 perpendicular to the slant plane containing the elevation trunnion axis 12 of the guns and the gun orientation as by means of pivots 116 fixed to and carried by the gun. Bail ring 113 is thereby adapted to exert torques or forces on the gyro rotor casing 104 about axis 114.

Fixed to the pivot axis 114 of bail ring 113 is a pulley 117 which is coupled to a second pulley 118 by means of suitable springs 119. Pulley 118 is adapted to be angularly displaced by the gun elevation rate shaft 23' as by way of suitable gearing 121 and 122. In this way the angular displacement of shaft 23', corresponding to the gun elevation rate set up by the operation of manual control 19, is transformed into a corresponding angular displacement of pulley 118. This displacement of pulley 118 serves to stress the springs 119 and to produce a proportional torque upon pulley 117 and the connected bail ring 113 about the axis 114. This torque is transmitted to the gyro rotor case 104 by means of slot 112 and rotor case extension 111.

As is well known, a free gyro will respond to a torque impressed thereon by precession or rotation about an axis perpendicular to both the axis of the applied torque and the spin axis, and at an angular velocity proportional to this torque. Accordingly, the torque thus applied to the gyro rotor casing 104 will produce precession of the spin axis 110 about the perpendicular axis 106 at an angular velocity proportional to this torque. It will be seen therefore that spin axis 110 of gyro 104 is thereby precessed in elevation at the required gun elevation rate.

According to the present invention, the gyro 105 then controls the movement of the guns 11 through a quick-acting follow-up system which operates to maintain the guns 11 always in positional correspondence with the spin axis 110 of the gyro 105. Relative displacement between the orientations of spin axis 110 and guns 11 in elevation is sensed by the pick-off 123 having an armature 124 actuated by the motion of spin axis 110 in elevation, which armature cooperates with a second core member 126 fixed to the guns. Core member 126 is illustrated as being of the well-known three-legged or E type core having a winding on its central leg energized by alternating current from any suitable source and having a pair of signal pick-up or output windings on the outer legs connected in series opposition. As is well known, upon relative displacement between armature 124 and core member 126 an output signal voltage is produced across output leads 127, which voltage will have a phase sense corersponding to the sense of this relative displacement and a magnitude corresponding to the amount of this relative displacement.

This output voltage across leads 127 is then connected to a suitable control amplifier 128 in whose output cable 32 there is produced a corresponding control voltage. Control amplifier 128 may be of any suitable type, including well-known phase-sensitive circuits and rate or integral taking circuits for producing an output voltage which, when utilized in the manner described below, will assure close following of the guns 11 with respect to the spin axis 110 substantially without hunting or lag. Such circuits are well-known in the art and are believed to require no further description here.

The output 32 of amplifier 128 is then fed to a suitable conventional torque motor 129 which is adapted to produce an output torque proportional to its signal voltage input. This torque output is then connected to proportionately displace the arm 210 and shaft 211 against the restraining torque of spring 212. Shaft 211 is then connected through a conventional torque hydraulic amplifier 131 to actuate the control 35' of the A-end 35 of the elevation servo unit. The output shaft 39 of the B-end 37 of the servo unit then actuates the guns 11 in the manner already described to reposition pick-off core 126 into correspondence with its armature 124 and in so doing positions the guns 11 into elevational correspondence with the orientation of the spin axis 110.

An exactly similar control for the azimuth coordinate is utilized. In this instance displacement of manual control 19 operates through gearing 102, gearing 103, pulley 118', and springs 119' to produce a proportional torque tending to rotate pulley 117'. Thus, a torque proportional to the desired gun azimuth rate is applied about axis 106 of the gyro 105 to produce the desired rate of precession of spin axis 110 about axis 114, that is, in the slant plane containing the elevation trunnion axis 12 and the gun orientation, which plane is parallel to the plane containing axes 106 and 110. The remainder of the control system for azimuth is identical with the elevation control already described. The azimuth control apparatus is given the same number as the corresponding elevation control apparatus but is primed.

It will be appreciated that although the guns rotate in true azimuth, that is, about a normally vertical axis, the gyro rotates in slant plane azimuth, that is, about an axis perpendicular to the plane of the gun trunnion axis 12 and the gun orientation. Thus, the operator must displace his manual control 19 in azimuth by an amount proportional to that slant plane azimuth rate which corresponds to the true azimuth rate of the guns which is desired. This conversion from slant plane azimuth rate to the corresponding true azimuth rate is made in the azimuth follow-up system consisting of the pick-off 123' and the associated servo system, which follow-up system causes the guns to rotate in true azimuth at a rate equivalent to their desired rotation in slant plane azimuth as indicated by the rate of rotation of the gyro about axis 114. Accordingly, the angular displacement of input shaft 23 to the computing mechanism 16' is proportional to the gun azimuth rate in the slant plane. It is appropriate to employ this slant plane rate in computing the azimuth lead angle, since the line of sight defined by the optical axis must necessarily be offset from the gun axis in the slant plane, and therefore a slant plane azimuth lead angle is required to be computed.

Since the guns and the computing mechanism carried thereby are controlled solely from the gyro 105, it will be clear that both the guns 11 and line of sight 101 are effectively stabilized against any variations in the attitude of the craft carrying the apparatus. This follows from the consideration that gyro 105 is essentially a free gyro, having three degrees of freedom, so that the orientation of its spin axis 110, in the absence of control torques applied to the gyro, will be maintained fixed in space. The guns 11 and line of sight 101, being controlled in accordance with the orientation of spin axis 110, will thereby also be fixedly maintained in space, even if the craft should change attitude.

The operation in response to a change of attitude of the craft is as follows: As the craft changes its attitude, it tends to carry with it the guns 11 and the computing and stabilizing mechanism 16 supported on the craft. Gyro 105, however, maintains its spin axis 110, and therefore the pick-off armatures 124 and 124', fixed in space. The motion of the craft therefore tends to move the pick-off cores 126 and 126' relative to their armatures 124, 124'. The signals thereby produced in these pick-offs operate the elevation and azimuth servos to restore the pick-off cores 126 and 126' into correspondence with their armatures 124 and 124'. In so doing, the guns 11 move with respect to the craft, and in such a manner as to maintain a fixed orientation in space, as determined by the spin axis 110. Hence, the guns 11 are essentially independent of any changes in attitude of the craft. This provides a great improvement in the operation of the apparatus, since the gunner or operator need not compensate for any changes in attitude of his craft, but need actuate the manual control 19 only to compensate for relative motion between the target and his own craft in space, without the necessity of correcting his control each time his own craft changes its attitude in space.

In the stabilizing apparatus of Fig. 2, difficulty may be experienced in obtaining a proper control, since even a slight motion of the gyro with respect to the guns, such as is necessary to provide a pick-off signal from pick-offs 123, 123', serves to impress improper torques upon the gyro. For example, a control torque applied to pulley 117, and thereby producing a precession about axis 106, tends to rotate pulley 117' at least by the amount necessary to provide a signal at pick-off 123. This displacement of pulley 117' is resisted by the springs 119', whereby a torque is applied to the gyro about axis 106 producing a spurious precession about axis 114.

This undesirable effect is rendered negligible in the apparatus of Fig. 2 firstly, by employing extremely sensitive pick-offs 123, 123' so that the displacement of the gyro with respect to its mount necessary to produce a satisfactory signal is extremely small, in other words, the guns follow the gyro with a very small lag; and secondly, by employing very lightly tensioned springs 119, 119' so that the small displacement of the gyro in one direction necessary to produce a satisfactory signal produces substantially no torque tending to produce precession in the other direction.

The modified stabilizing apparatus shown in Fig. 3 may also be used in order to substantially eliminate this spurious precession effect referred to above. As shown in Fig. 3, torques for precessing the gyro in elevation are impressed upon the gyro by means of a toggle mechanism 91 which comprises a four-bar pivotally connected linkage arrangement having a spring 92 tending to pull together two oppositely disposed pivots thereof. In this manner a force is exerted tending to separate the remaining two pivots. It will be appreciated that a condition of this four-bar linkage arrangement exists in which the force exerted on the latter pivots will be a maximum and, therefore, will vary but slightly with change in separations of these pivots. The linkage arrangement is adjusted to operate at this point, for reasons which will appear.

The constant force thus produced is applied as a torque to the gyro about its vertical axis 114. As seen in the figure, the toggle mechanism 91 is made translatable with respect to an arm 94 disposed at right angles to the pivot axis 114 of the gyro, and rigidly fixed to the outside bail ring 113 of the gyro. By adjusting the toggle mechanism 91 under the control of the elevation rate shaft 23, it will be seen that the lever arm or torque arm of this constant force exerted on arm 94 may be proportionately varied, thereby proportionately adjusting the torque applied to the gyro ring 113. In this way precessing torques proportional to the manual displacement of control 19 are impressed on the gyro.

Since the force applied by toggle mechanism 91' is adjusted to vary extremely little with small changes in spacing, it will be seen that the small movements of arm 94' necessary to permit actuation of pick-off 123 will produce substantially no change in force, and will prevent the harmful spurious precessing torques described above.

Figs. 4A and 4B taken together show the construction of the computing mechanism 16' of Figs. 2 and 3. As has previously been stated, this computing mechanism 16' is adapted, when set in accordance with indicated air speed (I.A.S.), altitude (H), and target dimension (T.D.), and when supplied with present target slant range data ($D_0$) by way of shaft 28, gun azimuth data ($A_g$) by way of shaft 52, gun elevation data ($E_g$) by way of shaft 54, gun azimuth rate data ($A_{rg}$) by way of shaft 26, and gun elevation rate data ($E_{rg}$) by way of shaft 23, to supply the lead angle in elevation and azimuth between the orientation of the guns 11 and the line of sight 101 which is required to properly direct the projectile to hit a target located along the line of sight 101 and having a range corresponding to the setting of slant range control shaft 28.

This computing sight 16' contains an improved form of range finder incorporated within the apparatus. This range finder comprises a member 137 having a conical end 138 which is highly polished to provide a conical reflecting surface. Concentrically mounted with respect to member 137 is a casing 139 formed to provide a circular slit 141. Surrounding slit 141 is a suitable continuous light source 142 adapted to project light rays through slit 141 upon the conical reflecting surface 138. Member 139 is made axially translatable, and in this manner the diameter of the circle of light reflected by the conical surface 138 may be continuously varied.

In the present invention this luminous circle forms the reticle for the optical system of the computing mechanism 16'. The diameter of the reticle may be adjusted by adjustment of range control knob 27 and shaft 28. In this way the range of a target having known linear dimensions may be determined by positioning the luminous circular reticle image to just circumscribe the target image, the displacement of the range control knob 27 necessary to accomplish this then being a function of target slant range. For this purpose member 139 is axially translated in accordance with the lift derived from a three-dimensional cam 143. Cam 143 is axially translated in accordance with the known target dimension (T.D.) as set in on target dimension control knob 30. Cam 143 is rotated under the control of the slant range control knob 27 by way of input shaft 28.

Cam 143 is so designed that when the linear dimension of the target is properly set in by means of knob 30 and when knob 27 and shaft 28 are adjusted so that the circular reticle provided by the invention just circumscribes the target image, the angular displacement of shaft 28 will represent a predetermined function of the slant range ($D_0$) of the target. Trigonometric analysis of the angles and dimensions of the triangles involved determines the design of such a cam since the size of the target image appearing in the optics is sufficient to fully determine the range to a target of known dimensions.

In operation, the circular reticle image is transmitted through the lens 200 to the elevation optic mirror 87 and is then reflected onto the azimuth optic mirror 87' and thence into the eye 100 of the observer. The line of sight 101 also passes through the mirror 87' which is of the reflex type, whereby the image of the target becomes superimposed upon the image of the circular reticle. As will later be explained, the line of sight defined by this reticle image is displaced with respect to the gun orientation by the amount necessary to provide the proper lead angle for the guns to direct a projectile toward the target.

For this purpose the gunner or operator will actuate manual control 19 to maintain the target image centralized within the circular reticle thus provided. In so doing, he displaces the azimuth rate control shaft 26 and the elevation rate control shaft 23 as previously explained.

Considering for the moment control in azimuth only, displacement of shaft 26 operates through a rack and pinion arrangement 147 to displace a lever 148 about fulcrum 149. Fulcrum 149 is made laterally adjustable and is displaced in accordance with the time of flight (T) for the projectile to reach the target.

This time of flight (T) may be taken to be substantially a function solely of slant range. As stated above, shaft 28 is angularly displaced in accordance with a predetermined function of slant range. This shaft is connected through suitable gearing and shafting to a cam 151 which is thereby rotated by an amount corresponding to this function of slant range. Cam 151 is so designed that its follower 152 is thereby axially displaced in accordance with the projected time of flight (T), and this displacement of follower 152 serves to position the fulcrum 149 in accordance with time of flight (T).

In this manner the displacement of the far end 153 of lever 158 is proportional to the amount of the displacement of shaft 26 and the displacement of fulcrum 149, that is, proportional to the product ($A_{rg}T$) of gun azimuth rate ($A_{rg}$) by the time of flight (T). This displacement, corresponding to the azimuth prediction angle based upon gun rate, is then led to one input of a differential 154 to be there combined with the azimuth ballistic correction angle ($\delta$) to obtain the azimuth lead angle ($\Delta A$)', based upon gun rate.

The azimuth ballistic correction ($\delta$), and also the elevation ballistic correction, or superelevation ($\phi_s$), may be determined in the manner disclosed in copending application Serial No. 455,968, for Ballistic Mechanism for Computing Gun Sights, filed August 22, 1942, in the names of C. G. Holschuh and D. Fram. As is therein described, two suitable three-dimensional cams 69 and 69' are rotated in accordance with gun azimuth ($A_g$) obtained, for example, from input shaft 52, and are translated in accordance with a composite function made up of component functions of: (1) slant range ($D_0$) obtained from input shaft 28, (2) indicated air speed (I.A.S.) set in by means of indicated air speed knob 31, and (3) altitude (H) set in by means of altitude knob 29, as described more in detail in the above-mentioned copending application Serial No. 455,968.

The resultant lift of follower 71 of cam 69 then serves to axially translate a further three-dimensional cam 72 which is rotated in accordance with gun elevation ($E_g$) obtained from input shaft 54. By proper design of the various elements described in accordance with the conditions discussed in the above-mentioned copending application, the lift of follower 73 of cam 72 may be made proportional to the superelevation correction ($\phi_s$), and the lift of follower 214 of cam 69' may be made proportional to the azimuth ballistic correction ($\delta$).

The lift of follower 214 is converted through suitable gears to a proportional angular displacement which provides the second input, corresponding to the azimuth ballistic correction ($\delta$), to the differential 154. Accordingly, the output of differential 154, derived as a displacement of shaft 156, is proportional to the sum of the gun rate azimuth prediction angle ($A_{rg}T$) and the azimuth ballistic correction ($\delta$), and therefore is proportional to the azimuth lead angle ($\Delta A$)' based upon the gun rate.

This displacement of shaft 156 is then led into an equating and delay unit 157 comprising a variable speed drive having a drive disc 158, a driven cylinder 159, and a displaceable ball carriage 161. The position of the ball carriage 161 is determined by the angular displacement of a worm cam 162 which is geared to the output member of a subtracting differential 163, the first input member of which is directly geared to cylinder 159, and the second input member of which is coupled to shaft 156. Variable speed drive 160 is of the type in which the angular velocity of the driven cylinder 159 is proportional to that of its drive disc 158, and the proportionality factor in turn is proportional to the displacement of ball carriage 161 from a null or datum position.

Equating unit 157 effectively acts as a torque amplifier incorporating a time delay in transmitting the angular displacement of input shaft 156 to its output shaft 164. Thus, a displacement of shaft 156 at first causes a displacement of ball carriage 161 from its neutral position. This causes a rate of rotation of cylinder 159 proportional to this displacement. The resulting displacement of cylinder 159 operates through differential 163 to reset ball carriage 161 to its neutral position, at which time the system is once more at equilibrium, and, as can be shown, the cylinder 159 has then been rotated through an angular displacement proportional to that of shaft 156. This time delay, which is produced by the time required for variable speed drive 160 to settle out, or resume its equilibrium condition, is necessary in order to convert the lead angle ($\Delta A$)' based on gun rate, appearing as a proportional rotation of input shaft 156, to the true lead angle ($\Delta A$) based upon line of sight rate, appearing as a proportional rotation of output shaft 164.

This delayed displacement of output shaft 164 is then connected by suitable gearing to rotate the azimuth optic mirror 87' through the true azimuth lead angle ($\Delta A$), whereby the image of the circular reticle is angularly displaced, and the orientation of the line of sight 101 thereby defined is caused to be displaced from the gun orientation by the desired azimuth lead angle. In this way, when a target is aligned with optical axis 101 and maintained in that condition by suitable manipulation of the manual control 19, the gun will be automatically set and maintained at the orientation required to properly direct a projectile toward the target in azimuth.

The control in elevation is substantially identical with that described for the azimuth coordinate. The displacement of shaft 23 representing gun elevation rate ($E_{rg}$) is multiplied by time of flight (T) in a lever arrangement 148' to produce the gun rate elevation prediction ($E_{rg}T$), which is then added in a differential 154' to the elevation ballistic correction, or superelevation ($\phi_s$) received from cam 72.

A similar equating and delay unit 157' is interposed between the displacement of shaft 156', representing the gun rate elevation lead angle ($\Delta E$)', and the elevation optic mirror 87, in a manner similar to that described with respect to the azimuth control, in order to displace the elevation mirror 87 by the true elevation lead angle ($\Delta E$) based upon the line of sight rate.

The gyro 105 is directly controlled, as shown in Figs. 2 and 3, from shafts 23' and 26' coupled directly to shafts 23 and 26. Dials 220 and 221 may be provided, if desired, to indicate gun elevation ($E_g$) and gun azimuth ($A_g$).

The present system constitutes a disturbed gun sight, that is, one in which the orientation of the gun is directly controlled from the manual control, and in which the optical axis of the sighting instrument is automatically offset therefrom by the amount required to provide the proper lead angle for the gun to direct a projectile at the target.

As is well known, such disturbed gun sight systems are inherently unstable, since, for example, actuation of the control to cause the sight to catch up with a target results in a larger input gun rate and a larger prediction correction, which, in turn, produces a larger deflection of the eoptic mirror 87 or 87', thereby tending to drive the optical axis 101 in a direction opposite to that desired. The necessary condition for a stable system is that this latter effect never exceeds the direct effect on the optical axis resulting from actuation of the control 19 to rotate the guns. More generally, in order to maintain stable operation it is necessary that the rate of change of the lead angle never be greater than the rate of change of the gun angle with respect to space, as otherwise the line of sight would travel in space in an opposite direction to that of the guns and to that of the control influence exerted by the operator.

It would seem that this required condition for stability could be met by merely employing a constant time delay in the application of the lead angle corrections to the optic mirrors. Further analysis, however, shows that it is also necessary to make the delay proportional to the time of flight (T). Thus, for close-in targets having a small slant range, and, therefore, a small time of flight (T), the rate of change of the gun rate prediction angle ($A_{rg}T$, $E_{rg}T$) components of the lead angles, resulting from a particular rate of change of gun angle, is less than it would be for a distant target for which the time of flight would be larger. Therefore, for close-in targets less delay in the application of the gun rate prediction angles is required in order to insure stable operation than for distant targets. Accordingly, as far as the prediction angle components are concerned it would be desirable to make the delay proportional to the time of flight (T).

In order to prevent changes in the ballistic components of the lead angles from overcoming the direct effect upon the optical axis exerted by the operator, it is also desirable to delayably apply these ballistic components. An analysis shows that here too the amount of delay should be made proportional to time of flight for best results. Thus, for close-in targets, having high angular rates, the ballistic components of the lead angles are ordinarily small as compared to the prediction angles, and therefore variations in the ballistic components have a comparatively smaller effect on the total lead angles than in the case of distant targets. Therefore, for close-in targets less delay is required to be applied to the ballistic components also. Accordingly, the delay introduced in the total lead angles through the action of the variable speed drives 160, 160' is made proportional to time of flight (T).

In the present instance, this required delay is produced in the equating circuits 157, 157'. The delay produced by such circuits depends upon the angular velocity of the drive discs 158, 158' of the variable speed devices 160, 160'. It will be appreciated that the higher this arrive at their equilibrium condition, that is, one in which angular velocity, the quicker will cylinders 159, 159' arrive at their equilibrium condition, that is, one in which they have been displaced by an angle respectively proportional to that of the input shafts 156, 156' and hence the less will be the delay. In other words, output shafts 164, 164' will more closely follow input shafts 156, 156'. On the other hand, the lower the speed of drive discs 158, 158', the greater is the delay introduced.

In order to adjust the delay in accordance with time of flight (T), the speed of drive discs 158, 158' is varied inversely according to time of flight. For this purpose, the drive discs are driven from the output of a further variable speed drive 166 whose ball carriage 167 is actuated from the lift of cam 168 which is rotated from the slant range shaft 28. Cam 168 is so designed that its lift is proportional to the reciprocal of time of flight $$\left(\frac{1}{T}\right)$$

Thus, the cylinder of variable speed drive 166 will actuate drive discs 158, 158' at a speed inversely proportional to time of flight, thereby introducing a time delay in equating circuits 157, 157' proportional to time of flight (T).

The introduction of a delay proportional to time of flight can be considered from an entirely different standpoint than that of stability as above discussed. From a rigorous mathematical analysis of the pure fire control problem involved, it can be seen that this delay is necessary in order that the lead angles actually introduced be based upon the angular rates of the line of sight instead of the gun rates.

In order for the azimuth lead angle ($\Delta A$) actually introduced between the gun azimuth position ($A_g$) and the azimuth position of the line of sight ($A_0$) to be correct, it must be equal to the product of the line of sight azimuth rate ($A_{r0}$) by time of flight (T) plus the azimuth ballistic correction angle ($\delta$). Therefore we may write, (1) $\quad \Delta A = A_{r0}T + \delta = A_g - A_0$ where $\Delta A$ is the actual azimuth lead angle appearing as a proportional rotation of shaft 164.

Differentiating Equation 1 we get, (2) $\quad \dfrac{d\Delta A}{dt} = A_{rg} - A_{r0}$ Writing the equation of variable speed drive 160 the following relationship is obtained, (3) $\quad \dfrac{d\Delta A}{dt} = K \times \text{displacement of cam 162}$ where K is proportional to the speed of drive disc 158. Substituting in Equation 3 the displacement of cam 162, which is the difference in the inputs to differential 163, we get, (4) $\quad \dfrac{d\Delta A}{dt} = K(A_{rg}T + \delta - \Delta A)$ Substituting the values of $\Delta A$ and $$\frac{d\Delta A}{dt}$$

from Equations 1 and 2, (5) $\quad A_{rg} - A_{r0} = K(A_{rg}T + \delta - A_{r0}T - \delta)$ Equation 5 reduces to, (6) $\quad K = \dfrac{1}{T}$ which shows that in order to obtain the correct value of the lead angle ($\Delta A$) as a proportional rotation of shaft 154 the speed of variable speed drive disc 158 must be inversely proportional to time of flight (T).

Fig. 5 shows a modification of the computing mechanism and of the range finder of Figs. 4A and 4B. The improved form of stadiametric range finder shown here is adapted to produce a type of indication similar to that of Fig. 4B, but in a different and improved manner.

Thus, in the present case, a light source 192 projects its light rays onto a parabolic surface of revolution 193, which may be formed as the surface of a transparent body 194 composed, for instance, of polystyrene, "Lucite" or other easily workable transparent material. This apparatus is shown more in detail in Fig. 6. Thus, the surface of the member 194 facing the source 192 may be curved as at 196 to provide a convex lens to create parallel rays of light such as 197 within the transparent material 194. Other methods of producing parallel light rays, such as a suitable reflector behind source 192, may also be used. These parallel light rays are then reflected from the parabolic surface 193, which may be silvered or otherwise prepared to efficiently reflect light rays.

The central part of the parabolic surface is cut-away as at 199 and a conical reflecting surface or mirror surface 201 is placed in coaxial relation with the surface 193. The surface of the cut-away portion is made opaque, as by painting or any other suitable method, except for a narrow circular gap as at 202.

The parabolic surface 193 is designed to have its focus at the circle defined by the gap 202 so that all the light rays emitted by the source 192 pass through the gap and are reflected from the mirror surface 201 toward the lens 200. Since all the light rays striking the mirror surface 201 may be considered as originating at the gap 202, a virtual reticle image of the gap is formed at the base of the conical surface, as schematically indicated by the dots, which image will be reflected through lens 200 to the azimuth and elevation optics and thence into the eye. In the same manner as discussed with respect to the range finder of Fig. 4B, the diameter of this circular reticle image may be adjusted by moving the transparent body 194 relative to the conical mirror 201, as by means of a suitable cam 143.

Figs. 7, 8 and 9 show another modification of such a range finder apparatus which is structurally simpler than the above. In this case, the parabolic mirror 193, instead of being formed as the outer surface of the transparent material 194, is formed as the inner reflecting surface 193' of an opaque, for example, metallic member 194'. The non-parabolic portion 195 of this member may be made opaque and a light shield 203 may cooperate with portion 195 to provide a gap similar to gap 202 of Fig. 6. In this case, however, instead of the gap being clear, suitable diffusing material in the form of a thin ring 204 is inserted in the gap. Preferably, although not necessarily, shield 203 is formed integrally with member 206 which is of such material as will readily transmit the light rays 197 therethrough. The portion 203 of member 206 may be opaque as by painting or in any other suitable manner. If desired, of course, parabolic mirror 193' could be made as a simple metallic shell as by spinning or pressing, and shield 203 could also be made as a cylindrical opaque material, such as sheet metal.

As shown in Fig. 7, the parallel light rays are obtained from the light source 192 by reflection from the parabolic mirror 216. Substantially all of these parallel rays will be reflected from the parabolic reflecting surface 193' onto the ring 204 of diffusing material, thus creating a bright and intense ring of light, a virtual image of which is formed by the conical mirror 201. This image may then be used as the circular reticle image for the optics, as before.

In practice, difficulty has sometimes been experienced by the operator in locating the circular reticle image in his optics. This difficulty is most often encountered when tracking a distant target since at such times the circular reticle image is small. In order to overcome this difficulty, the present range finder is adapted to provide, in addition to the circular reticle, supplementary reticle lines at right angles to each other and terminating at the circular reticle, as shown at 18 in Fig. 1. It has been found that such additional lines are extremely helpful to the operator in locating the circular reticle.

The manner of obtaining these reticle lines is more clearly shown in Figs. 8 and 9. As there shown, four semi-cylindrical slots are cut longitudinally along the outer surface of shield 203. Narrow slits 223 are then cut through shield 203 from the cylindrical slots to the inner surface of the shield. Bars of a suitable diffusing material 222 are then snugly cemented or glued into the slots.

In operation, stray light rays, which either have not quite been rendered parallel by the mirror 216 or which have not been focused exactly on the diffusing ring 204 by the reflecting surface 193', strike the diffusing bars 222 and render them luminous. Light rays from bars 222 emerge through slits 223 and strike the conical mirror 201, thus forming a virtual image of slits 223. This virtual image is superimposed upon the circular image of ring 204 to form a reticle image as indicated at 18 in Fig. 1.

Fig. 5 shows also an improved computing mechanism 16' for obtaining the necessary lead angles. The data corresponding to the gun elevation ($E_g$) and gun azimuth ($A_g$) is supplied to the computing mechanism of Fig. 5 by way of shafts 54 and 52, as in the preceding drawings. Slant range ($D_0$) data is supplied by way of shaft 28 from range control knob 27. As before, target dimension (T.D.), indicated air speed (I.A.S.), and altitude (H) are set in by their respective control knobs 30, 31 and 29, these controls being substantially the same as in the preceding figures. Gun elevation rate ($E_{rg}$) and gun azimuth rate ($A_{rg}$) are derived from the displacement of manual control 19, as in Fig. 4A.

In the present case, the determination of the ballistic corrections, or ballistic components of the lead angle, is performed in exactly the same way as in Figs. 4A and 4B, to produce an output angular displacement of shaft 171 corresponding to the desired azimuth ballistic correction ($\delta$) and of shaft 172 corresponding to the required elevation ballistic correction ($\phi_s$).

In the present instance, however, the prediction correction is obtained in an improved manner, incorporating further advantages over that shown in Figs. 4A and 4B. In the preceding figures, the time of flight (T) of the projectile was determined solely as a function of slant range. This is an approximate solution satisfactory under some conditions. However, for a more accurate solution, the time of flight should be considered as a function of further variables.

Thus, it will be seen that any change which tends to change the opposition of the surrounding air to the flight of the projectile will have a definite influence upon the projectile time of flight. Quantities thus affecting time of flight include indicated air speed, altitude and gun azimuth. Thus, an increase in altitude produces a decrease in density of the surrounding air, which decreases the opposition to the flight of the projectile, and thereby decreases time of flight. For forward targets an increase in air speed has the opposite effect, since it produces the same effect as a head wind. However, for most aircraft upon which such apparatus is mounted, the indicated air speed varies only within a limited range during battle, so that the effect of variation of air speed may be taken to be a second or higher order correction and hence negligible with respect to the other factors to be considered.

Gun azimuth also has a definite effect upon the time of flight since, for azimuth orientations forward of the craft, the relative wind opposes the flight of a projectile, while, for azimuth orientations of the gun rearward of the craft, the relative wind assists the flight of the projectile. For other azimuth orientations intermediate to these extremes, corresponding variations in the time of flight are caused. Slant range, of course, remains a primary factor in the determination of the time of flight, the remaining factors being of the nature of correcting or modifying influences.

According to the present invention, the time of flight of the projectile is taken to be a function of altitude, slant range and gun azimuth. It has been found to be satisfactory and sufficiently accurate to utilize a product of functions respectively of slant range, altitude and gun azimuth in the determination of the time of flight. For this purpose, the altitude scale cooperating with control knob 29 is suitably calibrated to give an angular displacement of shaft 173 which is a logarithm of the desired function of altitude. This function may be the same as that utilized in the determination of the ballistic corrections described above and in prior copending application Serial No. 455,968, or differing therefrom merely by a proportionality factor.

The proper function of slant range is obtained as a proportional angular displacement of shaft 28 by means of the range finder of the present invention. In this range finder, a suitable reticle is obtained in the nature of a variable diameter circle, as previously explained, and the variation in diameter of this circle is so related to the target dimension of the target and to the range of the target that, when the diameter of the circle is adjusted by means of range control knob 27 to just circumscribe the image of the target viewed through the optical system of the invention, shaft 28 will be angularly displaced from a predetermined datum in accordance with the logarithm of the required function of slant range ($D_0$).

This angular displacement of shaft 28 is then added by means of a suitable differential 174 to that of shaft 173, which corresponds to the logarithm of the required function of altitude. The resultant sum of these angular displacements is supplied to another differential 176 whose other input member 177 is angularly displaced in accordance with the logarithm of a predetermined function of gun azimuth. This latter quantity is obtained from a suitable cam 178 which is rotated in accordance with gun azimuth, and is so designed that its follower 179 is translated proportionally to the logarithm of the required function of gun azimuth.

As a result, a time of flight cam 181 is rotated in accordance with the sum of the logarithms of the required functions of altitude, slant range and gun azimuth. Cam 181 is essentially an anti-logarithmic cam, with slight modifications to be later described, and produces an output displacement of a variable fulcrum 182 in accordance with the time of flight (T) of the projectile determined in the above manner.

In this way, a more accurate determination of the time of flight is produced, which, when utilized in the present prediction determining mechanism, produces a more accurate prediction lead angle for offsetting the line of sight with respect to the guns. To obtain this prediction correction, the displacement of handle-bar control 19 in azimuth is repeated as a corresponding angular displacement of azimuth rate shaft 26, as in Fig. 4A. This angular displacement of shaft 26 is then supplied to the gyro through shaft 26' in the same manner as is shown in Figs. 2, 3 and 4A, whereby the gyro and guns are caused to rotate at an angular velocity corresponding to this displacement. This gun azimuth rate is also supplied to an equating differential 183, whose other input member 184 is displaced in accordance with the motion of the output side of a lever 186 having the variable fulcrum 182 as a pivot.

The resulting output displacement of differential 183 correspondingly displaces the ball carriage 187 of a variable speed drive 188 whose drive disc 189 is rotated at constant speed from a suitable constant speed motor 217. The resultant angular displacement of the output cylinder 190 of variable speed drive 188 is set into a differential 191 whose second input member is supplied with the azimuth ballistic correction (δ) from shaft 171. The resultant output of differential 191, representing the sum of the angular displacement of cylinder 190 and azimuth ballistic correction (δ), is caused to displace the input side of lever 186.

Neglecting for the moment the effect of the azimuth ballistic correction (δ), that is, assuming that this correction is non-existent for the time being, it will be seen that a predetermined angular displacement of control member 19 and shaft 26 in azimuth will correspondingly displace the ball carriage 187 of variable speed drive 188. Cylinder 190 will thereby be rotated and will operate through lever 186 and differential 183 to restore the ball carriage 187 to its neutral position. The magnitude of the angular displacement of cylinder 190 thereby produced will not correspond to the displacement of shaft 26 because of the time of flight multiplication performed by the lever 186; that is, the displacement of cylinder 190 required to cause member 184 to restore ball carriage 187 to its neutral position will depend upon the setting of the fulcrum 182, and therefore will depend upon the time of flight of the projectile.

The modification of the cam 181 referred to above from a true logarithmic cam is adapted to assure that the displacement of cylinder 190 after ball carriage 187 has returned to its neutral position will be proportional to the product of the time of flight by the displacement of azimuth rate shaft 26. For this, it is necessary that the input to lever 186 be divided by the time of flight to produce its output, or, to state the same thing in another form, that the input to lever 186 be the product of its output by time of flight. As is well known, such a lever multiplying device is not a true linear multiplier except when the fulcrum is close to one end. Therefore, cam 181 is so designed as to counteract the non-linearity of this multiplication. In other words, the motion of fulcrum 182 departs from true linearity with respect to time of flight by the amount necessary to assure that the output of lever 186 is the true quotient of its input divided by time of flight (T). Accordingly, in response to displacement of control 19 and azimuth rate shaft 26, the cylinder 190 will be displaced after ball carriage 187 has returned to its neutral position by an amount proportional to the product of the time of flight by the gun azimuth rate.

However, cylinder 190 actually is also displaced in proportion to the azimuth ballistic correction (δ). Thus, displacement of shaft 171 operates through differential 191, lever 186, and differential 183 to offset the ball carriage 187. This causes cylinder 190 to rotate until the ball carriage 187 is returned to neutral, at which time cylinder 190 will have been displaced by an amount equal to that of shaft 171.

It will be clear that the total instantaneous displacement of cylinder 190 thus produced will be equal to the total lead angle based on gun rate $A_{rg}T+\delta=\Delta A'$, but delayed in time by the amount necessary for the variable speed drive to "settle out" or assume an equilibrium condition. As discussed relative to Fig. 4A, it is necessary to adjust this delay or settling time in accordance with the time of flight in order to assure that the gun rate lead angle (ΔA)' delayed be equal to the true lead angle (ΔA) based on line of sight rate. In the device of Fig. 4A this result was obtained by varying the speed of the drive discs of the variable speed drives, incorporating the delay, inversely according to time of flight. This necessitated an additional variable speed drive. In Fig. 5, this effect is automatically produced by the apparatus thus far described.

Thus, for distant targets, because of the division by the corresponding large time of flight which is incorporated in the lever and fulcrum arrangement 186, 182, a large displacement of cylinder 190 will be required in order to balance out of differential 183 any change occurring in the displacement of rate shaft 26. Thus a comparatively long time will be required to return ball carriage 187 to its neutral position. The delay introduced in prediction angle will therefore be large for distant targets, but will be small for close-in targets in which the division in the lever and fulcrum arrangement will be by a smaller time of flight factor.

Similarly, by virtue of the same time of flight division accomplished in the lever and fulcrum arrangement, the change in the ball carriage position effected by a particular change in the ballistic angle will be smaller for distant targets having large time of flights than for close-in targets having small time of flights. Therefore, for distant targets, a longer time will be required for cylinder 190 to balance out of differential 191 the displacement of shaft 171 corresponding to any change in the ballistic angle. Thus the delay introduced in the ballistic components of the lead angle is also proportional to time of flight.

That the resulting output displacement of cylinder 190 is equal to the true lead angle based on line of sight rate can be mathematically shown by an analysis similar to that employed with respect to Figs. 4A and 4B. Letting $x$ be the displacement of cylinder 190, and setting up the equation for the circuit consisting of variable speed drive 188, lever 186 and differential 183, we get, (1)  $$\frac{dx}{dt}=A_{rg}-\frac{(x-\delta)}{T}$$

Now, if the displacement ($x$) of cylinder 190 is equal to the true azimuth lead angle (ΔA), Equation 1 must satisfy the following fire control equations:

(2)  $$x=\Delta A=A_{r0}T+\delta=A_g-A_0$$

and (3)  $$\frac{dx}{dt}=A_{rg}-A_{r0}$$

Substituting the values of $x$ and $$\frac{dx}{dt}$$

of Equations 2 and 3 in Equation 1, we find that Equation 1 is satisfied, and the identity 0=0 is obtained. Therefore, we can be sure that the displacement of cylinder 190 is always instantaneously proportional to the true azimuth lead angle $A=A_{r0}T+\delta$.

The resulting output displacement of cylinder 190, representing then the true azimuth lead angle (ΔA), serves to angularly displace the azimuth mirror 87a, and thereby offsets the optical line of sight 101 by the azimuth lead angle (ΔA).

An exactly similar system is provided for control along the elevation coordinate, and serves to correspondingly displace the elevation mirror 87a' by the computed elevation lead angle (ΔE). In this case the elevation mirror 87a' is made of the reflex type through which the gunner sights at the target. At the same time, the reticle image, defining the orientation of the line of sight and also the range of the target, is projected upon the elevation mirror 87a' from the conical mirror 201 and azimuth mirror 87a to be there superimposed upon the image of the target for proper sighting. When the operator is properly tracking a target, the angular displacements of these two mirrors introduce the lead angle of the gun with respect to the line of sight 101 required to effect a hit.

In Fig. 11 there is shown another modification of the invention involving improved means for stabilizing the optical axis. In the prior modifications both the guns and the optical axis were stabilized from the gyroscope through a servo follow-up system which operated to maintain the gun orientation substantially coincident with the gyro orientation. As is well known, it is impossible in practice to obtain a follow-up system sensitive enough to cause the guns to instantaneously follow the gyro in all cases. In other words, there will always be some amount of lag or delay introduced by the servo system, especially should the craft be rolling and pitching violently. In such case, the guns and the line of sight defined by the optical system mounted thereon, will momentarily tend to follow the craft, and will therefore move off the target slightly, thus rendering tracking of the target by the operator more difficult.

This difficulty is avoided in the apparatus of Fig. 11 by introducing into the lead angle between the line of sight and the gun orientation an additional corrective or stabilizing angle, said angle being dependent on, and therefore compensating for, any instantaneous deviation between the gun orientation which may occur due to lag in the servo system.

For this purpose the gyro 105, which is shown looking along the elevation axis 106, has mounted on its casing 104 a stabilizing mirror 254. The line of slight 101' defined by the reticle formed by the range finder 253, in this case is reflected from the stabilizing mirror 254 and the fixed mirror 256 before being offset by the computed lead angles. By making the distance from the range finder 253 to the stabilizing mirror 254 equal to the distance from the stabilizing mirror to lens 200 via mirror 256, the line of sight is thus offset in elevation and azimuth by amounts just sufficient to compensate for any deviation existing between the gun orientation and the gyro orientation caused by lag in the servo follow-up system. In this way the line of sight is completely stabilized from the gyro independently of the servo system. It is obvious that this feature can be incorporated in any of the modifications previously described.

Fig. 11 also disclosed optional apparatus for introducing the lead angles (ΔE, ΔA), wherein only one mirror 257, mounted for rotation both in elevation and azimuth, is employed. As shown, mirror 257 is mounted on a large ring gear 258 for rotation about the azimuth axis. Gear 258 is rotated by an amount proportional to the azimuth lead angle (ΔA) from shaft 259, intermediate shafting and gearing, and pinion 260.

Slidably journaled in ring gear 258 is a rod 261, the flat upper portion 262 of which cooperates with the connecting member 263 projecting from mirror 257 to position the mirror in elevation. The lower portion of rod 261 rests upon a circular segmental table 264 integrally carried by rack member 265. Table 264 need project circumferentially only by an amount corresponding to the limiting value of the azimuth lead angle (ΔA) likely to be encountered in practice.

In operation, shaft 267, which is rotated by an amount proportional to the elevation lead angle (ΔE), produces a corresponding up and down movement of bar 261 through pinion 266 and rack member 265. The motion of bar 261 is then transmitted to the mirror 257 through the connecting member 263, producing an elevational displacement of the mirror proportional to the elevation lead angle (ΔE). Thus the line of sight 101 emerging from the optics is offset from the gun orientation by the required lead angles, and moreover, is completely stabilized.

It will be understood that suitable means for firing the guns may be provided for the operator wherever it is most convenient or desired. Any conventional firing device may be used, such as a firing key or button mounted on any of the other controls for operation by the operator's thumb, for example.

Although the present invention has been described with specific reference to a disturbed gun sight type of fire control system, many of the novel features disclosed have a general application to various other types of fire control systems, and it is to be understood that their application to other systems is contemplated and that the invention is not intended to be limited to the specific application described.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A computing gun sight comprising, a sighting device mounted on and adapted to be moved with a gun, said sighting device having an optical axis defining a line of sight to a target, a stabilizing gyroscope, servo follow-up means controlled by said gyroscope for maintaining the orientation of said gun coincident with the spin axis of said gyroscope, adjustable control means for applying precessing torques to said gyroscope to angularly position said spin axis in space at an adjustable rate, means providing a measure of the range to said target, a first computing mechanism controlled by said range means for deriving a measure of the projectile time of flight, a second computing mechanism controlled by the output of said first computing mechanism and the control means for computing the lead angle required between said gun orientation and said optical axis for effective gun fire, means automatically operated by the output of said second computing means for angularly offsetting said optical axis with respect to said gun orientation by an amount corresponding to said lead angle, and means interposed between said second computing mechanism and said offsetting means for automatically delaying the application of said angular offset, said delaying means comprising a variable speed device having a disc, ball carriage and cylinder, an equating differential, the output of which is connected to actuate said ball carriage, one input of which is driven in accordance with said computed lead angle and the other input of which is connected to said cylinder which is also connected operatively to the means for offsetting the optical axis, and means for actuating said disc at a rate corresponding inversely to said time of flight whereby said cylinder is displaced by an amount corresponding to said computed lead angle but delayed in time in accordance with time of flight.

2. A computing gun sight comprising, a sighting device mounted on and adapted to be moved with a gun, said sighting device having an optical axis defining a line of sight to a target, a stabilizing gyroscope, follow-up servo means controlled by the gyroscope for maintaining the orientation of said gun coincident with the spin axis of said gyroscope, adjustable control means for applying precessing torque to the gyroscope to angularly position said spin axis in space at an adjustable rate, means providing a measure of the range of said target, computing means controlled by the last mentioned means for deriving the projectile time of flight and also the ballistic component of the lead angle required between said gun orientation and said optical axis for effective gunfire, computing mechanism controlled by the computing means and the control means for computing the prediction component of said lead angle, means for algebraically adding the ballistic and prediction lead angle components to obtain a measure of the total lead angle, means controlled by the adding means for angularly offsetting said optical axis with respect to said gun orientation by an amount corresponding to said lead angle, and means operated by the adding means interposed between the adding and offsetting means for delaying automatically the application of said angular offset.

3. Apparatus, as claimed in claim 2, wherein the delaying means is actuated in accordance with time of flight by the range measuring means for the purpose of varying the delay.

4. Apparatus, as claimed in claim 2, wherein said delaying means comprises a torque amplifier actuated by the adding means, the torque amplifier including a variable speed device, means for actuating said variable speed device at a rate inversely proportional to said time of flight to correspondingly vary the amount of delay, and means for controlling the angular offsetting means of the optical axis from the output of the variable speed device.

5. Apparatus, as claimed in claim 2, wherein said delaying means comprises a torque amplifier including a disc, ball carriage and cylinder variable speed device, an equating differential, the output of which is connected to actuate said ball carriage, one input of which is driven from the adding means in accordance with said computed lead angle and the other input of which is connec ed to said cylinder, means for actuating said disc at a rate corresponding inversely to said time of flight, whereby said cylinder is displaced an amount corresponding to said computed lead angle but delayed in time in accordance with the time of flight and a mechanism coupling the cylinder with the means for offsetting the optical axis.

6. A computing gun sight comprising a sighting device mounted on and adapted to be moved with a gun, said sighting device having an optical axis defining a line of sight to a target, a stabilizing gyroscope, servo fol'ow-up means controlled by the gyroscope for maintain'ng the orientation of said gun coincident with the spin axis of said groscope, adjustable control means for angularly positioning said spin axis in space at an adjustable rate, means for obtaining a measure of the range of said target, computing means controlled by the last mentioned means and the control means for obtaining a measure of the projectile time of flight, and also a measure of the ballistic component of the lead angle required between said optical axis and said gun orientation for effective gun fire, and means actuated by the computing means in proportion to said measures of ballistic component and time of flight for producing a delayed measure of the total lead angle required, and means actuated by the range means for varying said delay in accordance with time of flight.

7. A computing gun sight comprising a sighting device adapted to define a line of sight to a target, said device being mounted on a gun for movement therewith, a stabilizing gyroscope, adjustable control means for applying precessing torque to the gyroscope for orienting the axis of said gyroscope in space at an adjustable rate, computing mechanism controlled by the adjustment of said control means for computing the lead angle required between said line of sight and said gun axis for effective gunfire, means for angularly offsetting the line of sight defined by said sighting device with respect to said gun axis by an amount corresponding to said computed lead angle, servo follow-up means controlled by the gyroscope for maintaining said gun axis substantially coincident with said gyroscope axis, and means positioned by the gyroscope effective when a lag exists between said gun axis and said gyroscope axis for further offsetting said line of sight with respect to said gun axis by an amount corresponding to said lag.

8. Apparatus as claimed in claim 7, wherein said last-named means comprises a mirror included in the optical axis of the line of sight fixedly mounted on the casing of said gyroscope.

9. Manual control apparatus for a computing gun sight, comprising a universally pivoted member having at least one hand grip for effecting movement thereof, shaft means controlled by the member, means coupled with said shaft means for setting displacements into the sight respectively corresponding to the angular displacement of said member about two independent axes, a motor for setting a further displacement into said sight, and switching means actuated by axial rotation of said hand grip for initiating and controlling the direction of rotation of said motor.

10. A gun sight comprising a sighting device mounted on and adapted to be moved with a gun, said sighting device having an optical axis defining a line of sight to a target, a stabilizing gyro, servo follow-up means controlled by the gyro for maintaining the orientation of said gun coincident with the spin axis of said gyroscope, adjustable control means for applying precessing torques for angularly positioning said spin axis in space at an adjustable rate, a computing mechanism for the sight, means for obtaining and setting into the computing mechanism of a measure of a function of the range to the target, means for setting into said computing mechanism measures of functions of the indicated air speed and altitude, means controlled by the orientation of said gun for setting measures of gun elevation and gun azimuth into said computing mechanism, means in said computing mechanism for obtaining from said several measures a measure of the ballistic component of the total lead angle required between the orientation of said gun and said line of sight for effective gun fire, additional computing mechanism actuated according to said measures of range, altitude, and gun azimuth for obtaining a measure of projectile time of flight, means actuated jointly by the additional computing mechanism in proportion to the time of flight and by said control member for obtaining a measure of the prediction component of the total lead angle, means for algebraically adding said measures of the ballistic and prediction components of the lead angle to obtain a measure of the total lead angle, and means actuated by the last mentioend means for angularly offsetting the line of sight by an amount corresponding to said total lead angle.

11. A computing gun sight, comprising a sighting device adapted to be moved with a gun, said sighting device having an optical axis defining a line of sight to a target, a stabilizing gyroscope, means controlled by the gyroscope for maintaining the orientation of the gun coincident with the spin axis of the gyroscope, adjustable control means for applying precessing torques to the gyroscope to angularly position the spin axis in space at an adjustable rate, means providing a measure of the range of the target, computing means controlled by the last-mentioned means for deriving the projectile time of flight and also the ballistic component of the lead angle required between the gun orientation and the optical axis for effective gun fire, computing mechanism controlled by the computing means for computing the prediction component of the lead angle, means for adding algebraically the ballistic and prediction lead angle components to obtain a measure of the total lead angle, and means controlled by the adding means for angularly offsetting the optical axis with respect to the gun orientation by an amount corresponding to the lead angle.

12. A computing gun sight, comprising a sighting device adapted to be moved with the gun, said sighting device having an optical axis defining the line of sight to a target, a stabilizing gyroscope, means controlled by the gyroscope for maintaining the orientation of the gun coincident with the spin axis of the gyroscope, adjustable control means for angularly positioning the spin axis in space at an adjustable rate, means for obtaining a measure of the range of the target, means controlled by the last-mentioned means for obtaining a measure of the projectile time of flight and also a measure of the ballistic component of the lead angle required between the optical axis and the gun orientation for effective gun fire, and means controlled in proportion to the measure of the ballistic component and time of flight and to the adjustment of the control means for producing a measure of the total lead angle required delayed in accordance with the time of flight.

References Cited in the file of this patent

UNITED STATES PATENTS

| | | |
|---|---|---|
| 1,201,105 | Saqui et al. | Oct. 10, 1916 |
| 1,722,923 | Just et al. | July 30, 1929 |

(Other references on following page)

UNITED STATES PATENTS

| Number | Name | Date |
|---|---|---|
| 1,788,996 | Gaedke | Jan. 13, 1931 |
| 1,894,788 | Riberolles | Jan. 17, 1933 |
| 2,047,922 | Seligmann | July 14, 1936 |
| 2,065,303 | Chafee et al. | Dec. 22, 1936 |
| 2,160,202 | Fieux | May 30, 1939 |
| 2,190,569 | MacGill | Feb. 13, 1940 |
| 2,206,875 | Chafee et al. | July 9, 1940 |
| 2,306,862 | Bown | Dec. 29, 1942 |
| 2,396,701 | Holschuh et al. | Mar. 19, 1946 |
| 2,405,068 | Tear et al. | July 30, 1946 |
| 2,407,191 | Tear et al. | Sept. 3, 1946 |
| 2,414,108 | Knowles | Jan. 14, 1947 |
| 2,414,608 | Pontius | Jan. 21, 1947 |
| 2,423,831 | Garbarini et al. | July 15, 1947 |
| 2,433,843 | Hammond et al. | Jan. 6, 1948 |
| 2,467,831 | Johnson | Apr. 19, 1949 |
| 2,476,300 | Holschuh et al. | July 19, 1949 |
| 2,478,839 | Ross | Aug. 9, 1949 |